March 10, 1970  J. Y. BARBIER ET AL  3,500,015
ELECTRIC HEATER ADAPTED FOR VERTICAL INSTALLATION AND UTILIZING
HEATED WATER AND FORCED AIR CIRCULATION
Filed Oct. 10, 1968
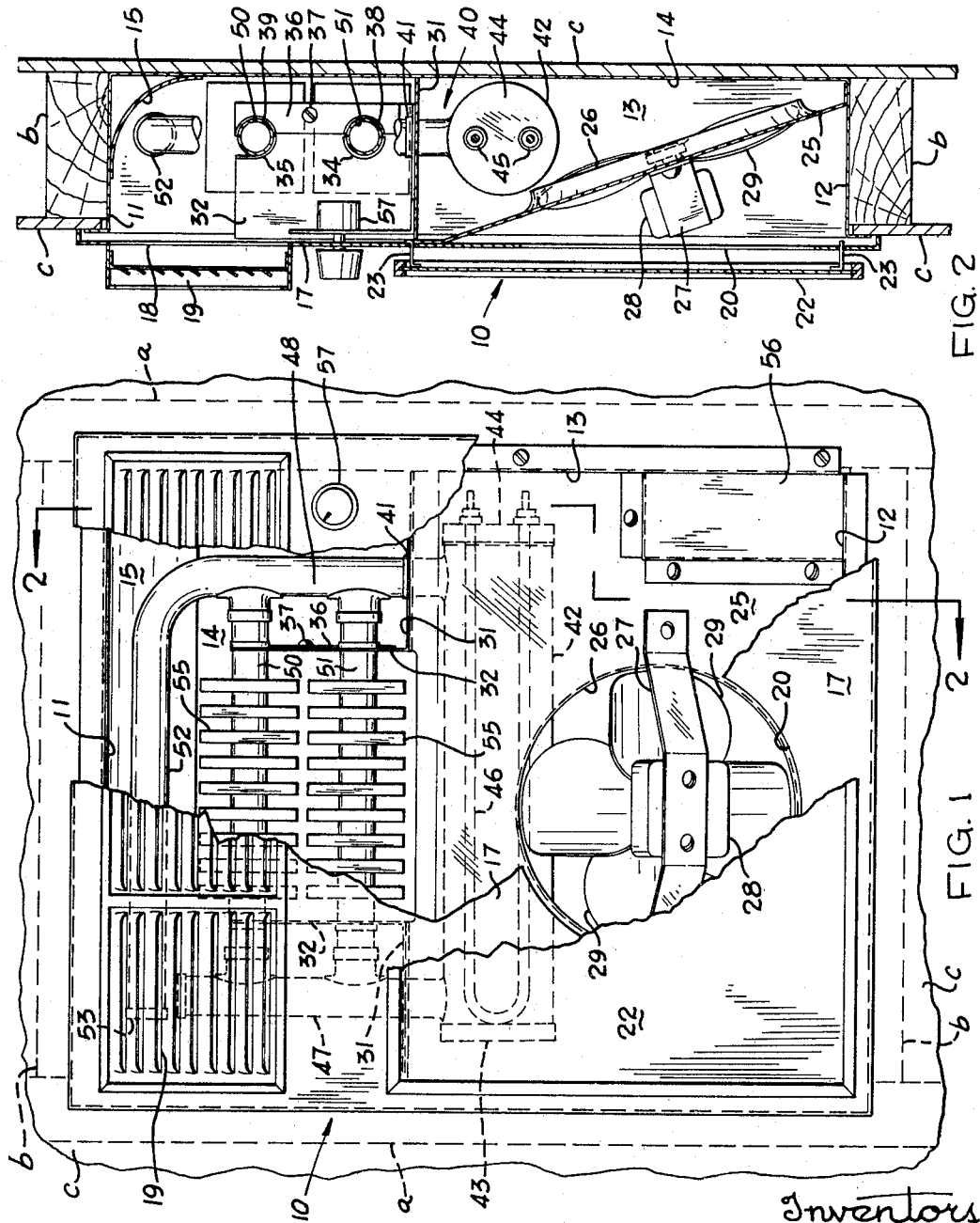
Inventors
JEAN Y. BARBIER
ELIZABETH J. PAPKE
By Jerome A. Gross
Attorney

United States Patent Office 3,500,015
Patented Mar. 10, 1970

3,500,015
ELECTRIC HEATER ADAPTED FOR VERTICAL INSTALLATION AND UTILIZING HEATED WATER AND FORCED AIR CIRCULATION
Jean Y. Barbier, Richmond Heights, and Elizabeth J. Papke, St. Louis, Mo., assignors to Intertherm Inc., a corporation of Missouri
Continuation-in-part of application Ser. No. 539,989, Apr. 4, 1966. This application Oct. 10, 1968, Ser. No. 766,562
Int. Cl. F24h 3/08, 3/10
U.S. Cl. 219—341     5 Claims

ABSTRACT OF THE DISCLOSURE

An electrical heater, suited for installation within walls of rooms, has a water heating chamber including a resistance heater unit, finned convector tubes, and an expansion tube arranged progressively above each other within a shallow cabinet having a lower air inlet and an upper air outlet. A fan baffle adjacent to the inlet and positioned on a steep slant within the shallow cabinet, serves as the inlet to a plenum chamber which confines air impelled by the fan to exit along the finned length of the upper convector tube.

CROSS-REFERENCE TO RELATED APPLICATION

This invention relates to self-contained electrical heaters which induce the circulation of heated water within a loop of tubing; and is a continuation-in-part of co-pending application Ser. No. 539,989, filed Apr. 4, 1966, now United States Patent No. 3,417,227 dated Dec. 17, 1968 entitled "Undercabinet Electric Space Heater Unit." The disclosure of that application, to the extent applicable, is incorporated herein by reference, and the benefit of its filing date is claimed.

BACKGROUND OF THE INVENTION

Electrical wall heaters, operating on the radiant heat principle, such as are frequently installed in bathrooms, are dangerous because the temperatures created are so excessive as to create the danger of fire should fabrics come in contact with it, or of injury to persons who may touch them. Self-contained baseboard heaters, which induce the circulation of heated water in a closed loop of tubing, past which convection air rises, such as shown in U.S. patent to Heiman No. 3,281,574, operate at much lower temperatures. However the length of the tubing loop required is too great to permit installation of such a heater in a shallow narrow space, such as between adjacent studs of the wall of a room.

In the co-pending application referred to, adequate capacity has been obtained from a relatively short heating chamber tube and convector tube utilized in a shallow horizontal cabinet; their heat transfer capacity is greatly increased by impelled circulation of air. To overcome the limitations of space, a baffle-mounted electric fan of adequate diameter is positioned slopingly in the shallow cabinet. The impelled air is confined in what is in effect a plenum chamber, so that its outflow is directed along the finned length of the convector tube.

SUMMARY OF THE INVENTION

Summarized generally, and without limiting its scope, the present invention is a high capacity, compact, room heater adapted particularly for vertical installation. It includes a cabinet having forward and aft walls so spaced opposite to each other as to establish its least internal dimension. Within the cabinet, between a lower air inlet and an upper air outlet, is a heater and heat exchanger which provides a closed path for circulation of a heated liquid. A lateral horizontal heating chamber tube contains a heating element and has a fluid reservoir thereabout. Positioned above the heating chamber tube and nearer to the air outlet are one or more lateral horizontal convector tubes having a finned length and tubular end connections joining the hearing chamber near its ends, thus providing a path for circulating flow of liquid. At a still higher level is an expansion-permitting means, extending upwardly from the convector tube.

Air impelling means are positioned adjacent to the air inlet. The preferred air impelling means is a fan whose diameter is larger than the spacing between the forward and aft walls. To provide sufficient length to accommodate a fan of such diameter, its baffle is positioned sloping upward and forward from the aft wall, to meet the forward wall at a level higher than the air inlet. Spaced baffles confine the air, flowing upward from the fan, to the finned length of the convector tube. Thus a plenum chamber is provided, through which the impelled air, so forced to exit over the finned length of the convector tube, cools the flow passages through which the heated liquid circulates. The temperautre of the heater never exceeds a moderate limit; yet adequate heating capacity is achieved along with small size.

BRIEF DESCRIPTION OF THE DRAWINGS

FIG. 1 is a front elevation of the present invention, with certain of the covering portions partly broken away.
FIG. 2 is a sectional view, taken along lines 2—2 of FIG. 1.

DESCRIPTION OF THE PREFERRED EMBODIMENT

The room heater illustrated in the drawings is adapted particularly for installation between the vertical studs *a* of a wall; and for framing above and below by wooden cross members *b* between its faces *c*. A cabinet generally designated 10 has an upwardly flanged top wall 11, a downwardly flanged bottom wall 12, and outwardly flanged left and right side walls 13, as well as an aft wall 14. At the juncture of the top wall 11 and the aft wall 14, a concave deflection plate 15 is mounted laterally.

Spaced from the aft wall, so closely as to establish the least internal dimension of the cabinet 10, is a laterally-extending forward wall 17 having an upper rectangular outlet opening 18 over which is an air outlet grill 19. Much of the lower portion of the forward wall 17 is cut away to provide a large air inlet opening 20; this is covered by a forwardly spaced plate 22, held in front of the opening 20 by brackets 23, shown in FIG. 2. Except for the small space occupied by the brackets 23, air may flow into the inlet opening 20 around the entire outer edge of the plate 22.

Inwardly of the air inlet opening 20, extending from the bottom wall 12, near its intersection with the rear wall 14, and sloping upwardly and forwardly to the forward wall 17 above the air inlet opening 20, is a fan baffle 25. It has a substantially centrally located circular baffle opening 26 spanned by a mounting bracket 27, which supports an electric fan 28 whose blades 29, accommodated within the circular baffle opening 26, are of greater diameter than the spacing between the forward wall 17 and aft wall 14 of the cabinet 10. The sloping installation of the baffle 25 provides sufficient length to accommodate the large diameter fan 28.

At its upper edge, the baffle 25 joins the forward wall 17 at a level higher than the air inlet 20. There, adjacent to and extending inward from the left and right cabinet walls 13, the baffle 25 has upper horizontal portions 31 which are formed integrally and turned aft to extend against the aft wall 14. These portions serve as horizontal baffle elements; to their inner ends are connected substantially vertical baffle element portions 32 which extend upward along the outer sides of the finned length of the convector tube means hereafter described. These baffle portions 31, 32 serve as means to confine the flow of air to the finned length of the convector tubes, hereafter to be described.

In the embodiment described, the upwardly extending baffle element portions 32 are spaced somewhat away from the aft wall 14. In their edges 33 so spaced away from the aft wall 14 are lower semicircular cut-outs 34; at the upper extremity of such edges 33 are rounded cut-outs 35. To fill the space from the edges 33 to the aft wall 14, mounting plates 36 are secured by one or more screws 37; these plates 36 have cut-outs 38, 39 complementary to the baffle element cut-outs 34, 35. To the left and right of the upwardly extending baffle portions 34, at a spacing corresponding to that of the vertical tubes 47, 48, the horizontal baffle portions 31 are provided with openings 41 for said tubes.

Mounted within the cabinet 10, by such the securement of the plates 36 to the upward extending baffle elements 32, is a sealed heater and heat exchange assembly generally designated 40. It includes a lateral horizontal heating chamber tube 42 of relatively large diameter, having brazed end caps 43, 44 at its left and right ends, respectively. The right end cap 44 supports the electrical terminal ends 45 of a sheathed resistance heater 46, which may be an elongated U-shape, as shown in dashed lines in FIG. 1. The heating chamber tube 42 serves also as a reservoir for a liquid which, on being heated by the heater 46, is induced to circulate. For permitting circulating flow to and from the heating chamber tube 42, pair of vertical tubes 47, 48 are connected by brazing into its upper wall adjacent to its left and right end caps 43, 44.

Between the tubes 47, 48 and brazed to communicate sealedly between them, are a lower convector tube 50 and upper convector tube 51, each extending laterally horizontal, substantially parallel to and above the heating chamber tube 42. Above the level of the upper convector tube 51, the right vertical tube 48 continues first upward and then is bent to extend laterally, spacedly above the upper convector tube 51, thus to serve as an expansion tube 52 which has a brazed-on end cap 53. Prior to sealing the assembly consisting of the heating chamber tube 42, the vertical tubes 47, 48 and the convector tubes 50, 51, it is filled above the level of the convector tube 51 with a liquid, for example, water to which an anti-freeze solution has been added, leaving air in the expansion tube 52.

Adjacent to their brazed connections to the vertical tubes 47, 48 the convector tubes 50, 51 are not finned; but for the greater part of their length, each of them is preferably fitted with a sheet of folded convector fins 55 best shown in FIG. 1, open at top and bottom. The length over which the tubes 50, 51 are so equipped with fins is referred to herein as their finned length.

Prior to final assembly of the entire room heater into the cabinet 10, the heater and heat exchange assembly 40 is mounted to the assembly of baffle elements 25, 31, 32 as follows: the heating chamber tube 42 is positioned beneath the horizontal portions 31; the vertical tubes 47, 48 are inserted through openings 41; and the horizontal convector tubes 50, 51 are positioned in the rounded cut-outs 34, 35 to enclose between the upward extending baffle portions 32 the entire finned length of the convector tubes 50, 51. The mounting plates 36 are then secured by the screws 37 so that their cut-outs 38, 39 complement the baffle element cut-outs 34, 35 in holding the heat exchange assembly 40 in place.

The elements so assembled are then inserted within the cabinet 10, as shown in the drawings, so that the heating chamber tube 42 is supported spacedly between the air inlet opening 20 and the air outlet opening 18, and the fan 28 in the baffle 25 is thus disposed between the air inlet opening 20 and the heating chamber tube 42.

Air impelled by the fan 28 will be caused to flow upwards across the heating chamber tube 42; above it the horizontal baffle portions 31 and upwardly extending portions 32 will confine the air so flowing upward substantially to the finned length of the convector tubes 50, 51. By this arrangement, the lower portions of the cabinet side walls 13, the cabinet aft wall 14, the fan baffle 25, the horizontal baffle portions 31 and the upwardly extending portions 32 serve in effect as a plenum chamber; air impelled by the fan 28 will be slightly pressurized and its escape will be efficiently confined to the finned length of the convector tubes 50, 51, for most effective heat transfer.

By conventional electric circuitry, not shown, utilizing the junction box 56, current is supplied to the terminal ends 45 of the resistance heater 46 and to the fan 28. A thermostatic control 57 is incorporated in the circuit in conventional manner.

The compactness of the present construction will be seen from FIG. 2. The fins 55 occupy the greater part of the depth of the cabinet as defined by its forward wall 17 and its aft wall 14. The convector tubes 50, 51 are spaced vertically from each other sufficiently to accommodate the fins. While only two finned convector tubes 50, 51 are shown, additional convector tubes could be utilized, if desired. The heating chamber tube 42 is of larger diameter than that of the converter tubes 50, 51, for efficient utilization of the relatively deeper space near the top of the sloping baffle 25. The available space between the studs $a$ is utilized efficiently by the vertical arrangement, between the air inlet 20 and outlet 18, of the fan baffle 25, the heating chamber tube 42, the plurality of finned convector tubes 50, 51, and the expansion tube 52. By impelling air and confining its flow in the manner of a plenum chamber, what would otherwise be a low capacity convection heater has been transformed into a high capacity unit, which, although it operates at a low safe temperature, produces far more heat than has heretofore been possible with circulating hot water heaters of similar size.

Variations from the preferred embodiment, so described, will be apparent from this specification. Accordingly, the present invention is not to be construed narrowly, but rather as co-extensive with the claims.

What is claimed is:
1. A room heater adapted for vertical installation, comprising
 a cabinet having forward and aft walls so spaced opposite to each other as to establish its least internal dimension, together with top, side and bottom walls,
 a lower air inlet and an upper air outlet,
 a horizontal heating chamber tube extending laterally substantially the entire width between said side walls and supported spacedly in the cabinet at a a level between the air inlet and the air outlet, said tube containing a heating element and forming a fluid reservoir thereabout,
 laterally-extending convector tube means positioned above the level of said fluid reservoir and nearer to the air outlet, and having a finned length shorter than the fluid reservoir,
 vertical tubular end connections extending from both ends of said convector tube means downward to join the fluid reservoir, whereby to complete a path for circulating flow of liquid,
 air-impelling means disposed between the air inlet and the fluid reservoir, and
 means to confine impelled air above the reservoir, laterally inwardly to a narrowed width including the finned length of the convection tube means,
 the air-impelling means being a fan having a diameter larger than the said least internal dimension of the cabinet, together with a baffle having a circular opening and means mounting the fan therein, the baffle being positioned sloping upward and forward from the aft wall to a level higher than the air inlet, whereby to provide sufficient length to accommodate said fan diameter.

2. a room heater as defined in claim 1, together with a quantity of liquid filling the heating chamber tube outwardly of the heating element, the convector tube means, and the tubular connections therebetween, and tubular expansion permitting means communicating with and extending upwardly above the level of the convector tube means.

3. A room heater as defined in claim 1, wherein the convector tube means includes a plurality of tubes spaced vertically above each other and having substantially equal finned lengths.

4. A room heater as defined in claim 1, wherein the means to laterally confine the air to the finned length of the convector tube means comprises a pair of baffle elements extending between said forward and aft walls and including substantially horizontal portions above the heating chamber tube and extending inward from the side walls to a spacing less than that of said tubular connections and greater than that of the finned length of the convector tube means, and substantially vertical portions extending upward therefrom inwardly of the vertical tubular connections and outwardly of the outer sides of said finned length.

5. A room heater defined in claim 1, wherein the convector tube means comprises a plurality of convector tubes each having fins, said convector tubes being spaced vertically apart from each other sufficiently to accommodate their fins, the fins occupying the greater part of the depth of the cabinet between its forward and aft walls, and wherein the heating chamber tube is of larger diameter than that of said convector tubes.

References Cited

UNITED STATES PATENTS

| | | | |
|---|---|---|---|
| 1,848,627 | 3/1932 | Head | 219—341 |
| 1,983,437 | 12/1934 | Carr | 219—341 |
| 2,562,436 | 7/1951 | Pass | 219—374 X |
| 2,565,769 | 8/1951 | Hatker | 219—369 X |
| 3,165,625 | 1/1965 | Potter | 219—369 |
| 1,945,815 | 2/1934 | Landerman | 219—365 |

JOSEPH V. TRUHE, Primary Examiner

R. F. STAUBLY, Assistant Examiner

U.S. Cl. X.R.

126—101; 165—107; 219—365, 370, 378; 237—16